United States Patent
Beppler et al.

(10) Patent No.: US 8,626,151 B2
(45) Date of Patent: Jan. 7, 2014

(54) PROACTIVE LATENCY-BASED END-TO-END TECHNOLOGY SURVEY AND FALLBACK FOR MOBILE TELEPHONY

(75) Inventors: David Beppler, Duluth, GA (US); Arthur Richard Brisebois, Cumming, GA (US); William G. Mansfield, Sugar Hill, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 372 days.

(21) Appl. No.: 12/823,336

(22) Filed: Jun. 25, 2010

(65) Prior Publication Data

US 2011/0319071 A1   Dec. 29, 2011

(51) Int. Cl.
| | |
|---|---|
| H04W 24/00 | (2009.01) |
| H04W 36/00 | (2009.01) |
| H04W 4/00 | (2009.01) |
| H04M 1/00 | (2006.01) |
| H04L 12/26 | (2006.01) |
| H04L 12/28 | (2006.01) |
| G06F 15/173 | (2006.01) |

(52) U.S. Cl.
USPC ........ 455/425; 455/436; 455/437; 455/422.1; 455/552.1; 370/252; 370/253; 370/254; 370/401; 709/223; 709/224

(58) Field of Classification Search
USPC ................................. 455/424, 425
See application file for complete search history.

(56) References Cited

U.S. PATENT DOCUMENTS

| | | | |
|---|---|---|---|
| 2004/0198360 A1* | 10/2004 | Kotzin ........................... | 455/445 |
| 2005/0239497 A1* | 10/2005 | Bahl et al. .................. | 455/552.1 |
| 2006/0084417 A1* | 4/2006 | Melpignano et al. .......... | 455/418 |
| 2006/0268711 A1* | 11/2006 | Doradla et al. ............... | 370/235 |
| 2007/0202915 A1* | 8/2007 | Karaoguz .................... | 455/550.1 |
| 2008/0102815 A1* | 5/2008 | Sengupta et al. ............. | 455/424 |
| 2010/0254306 A1* | 10/2010 | Kitaji et al. ................... | 370/328 |
| 2011/0096732 A1* | 4/2011 | Rashid et al. ................. | 370/329 |

FOREIGN PATENT DOCUMENTS

WO    WO 0135585 A1 *   5/2001

* cited by examiner

*Primary Examiner* — Dwayne Bost
*Assistant Examiner* — Nalini Mummalaneni
(74) *Attorney, Agent, or Firm* — Turocy & Watson, LLP

(57) ABSTRACT

A system and methodology that facilitates dynamically determining an end-to-end response of a network prior to the selection of a technology for an application, is provided. Moreover, a user equipment (UE) can perform a proactive latency-based end-to-end technology survey to select appropriate technologies for different applications based in part on application requirements, UE and network infrastructure capabilities, network load, concurrent uses, or other factors as determined by the service provider. The results of the survey can be compared with pre-established criteria, as broadcast by the network operator, to determine a network that can be utilized to support an application at a particular location, or to determine whether fallback to another technology provides better quality and/or efficiency can be performed.

20 Claims, 11 Drawing Sheets

PROACTIVE LATENCY-BASED END-TO-END TECHNOLOGY SURVEY AND FALLBACK FOR MOBILE TELEPHONY

TECHNICAL FIELD

The subject disclosure relates to wireless communication and, more particularly, to facilitating dynamic and/or proactive selection of a method, technology, and/or access point for a communication session based on real-time end-to-end network conditions.

BACKGROUND

With advances in mobile communication, wireless network service providers are moving to Voice over Internet Protocol (VoIP) and other new technologies to improve the efficiency of their networks and the quality of the service provided to the consumer. Voice calls are extremely susceptible to delay, jitter, and/or other impairments, which can be caused by various network conditions. For example, low capacity, high load, Quality of Service (QoS) settings, or other factors of the network, can negatively affect voice calls.

A conventional user equipment (UE) selects a particular technology for voice calls based on radio conditions surrounding the UE. Moreover, the UE can determine Radio Frequency (RF) signal strength, interference, and/or parameters broadcast in system messages or stored in the UE, to facilitate the selection. Typically, the UE can trigger a carrier frequency scan that can scan a radio environment near/surrounding the UE. The scan receiver can identify surrounding network carriers, and select a carrier/technology for communication based on the RF signal strength. However, this traditional approach of carrier/technology selection, does not guarantee a high quality of service. For example, even though the RF signal strength of the selected carrier/technology can be the highest, the selected carrier can provide a lower-quality service in scenarios wherein the backhaul network performance of the selected carrier/technology is not optimal (e.g., backhaul network is congested, has low bandwidth, etc.).

Multi-technology UEs typically have fixed or per-operator adjustable technology preference settings, which leave little or no room for customizable network selection. In fact, the UEs typically prefer new networks over older networks, without knowing which is best suited for the customer and/or desired service. Such features of traditional carrier/technology selection can result in inefficient performance and/or communication quality, and can negatively impact consumer satisfaction.

The above-described deficiencies of today's communications systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate performing a proactive latency based end-to-end technology survey at a user equipment (UE) to survey the available services or technologies in order to differentiate their performance potential and determine which service or technology is appropriate for available applications. In particular, the UE performs a loopback measurement to assess real-time end-to-end network conditions and determines which services can be employed to support an application at a location. In addition, the UE can determine whether fallback to another technology provides better quality or efficiency.

In one aspect, the loopback measurement can be performed periodically by the UE to asses whether conditions have changed, necessitating a change in service (between access technologies or transport methodologies) for applications or classes of applications. Additionally or alternately, the UE can perform the loopback measurement prior to placing a voice and/or data call to determine a technology utilized to establish the call. Further, the UE can also perform the loopback measurement, in the background, during a call, data session or other application. In the event that service degradation is determined within the cellular network, the UE can scan available alternate access and transport technologies that provide improved service quality and perform an in-call handover or revised network selection after the in-progress call is complete.

Yet another aspect of the disclosed subject matter relates to a method that can be employed to provide improved service quality for communication associated with a UE. The method includes assessing the ability of each network available to the UE, to deliver a high quality voice and/or data call. Moreover, the condition and/or availability of the backhaul circuits that carry the calls from the base station to the terrestrial telephone network or data network can also be determined. Further, a network that provides the best service quality for a particular call and/or application can be determined based in part on the assessment. Furthermore, communication associated with the UE can be established over the selected network.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
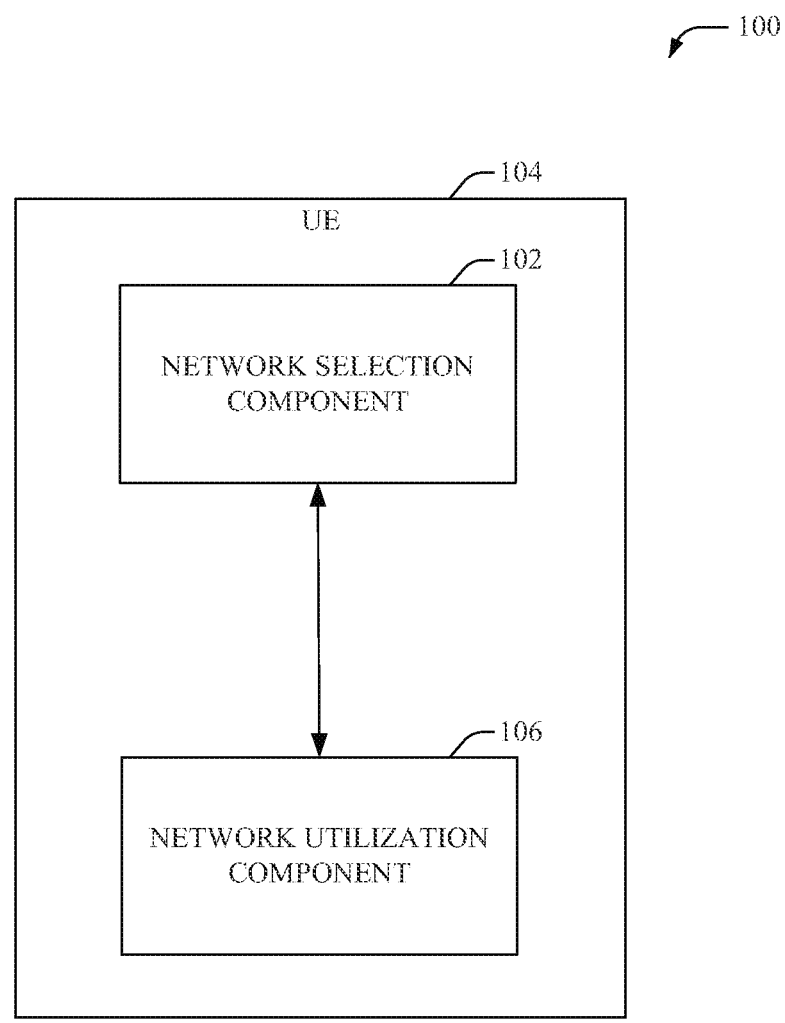
FIG. 1 illustrates an example system that facilitates delivery of a high-quality communication session, based in part on end-to-end network conditions.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," and the like are employed interchangeably throughout the subject specification, unless context warrants particular distinction(s) among the terms. Similarly, the terms "network operator," "service provider," are utilized interchangeably in the subject specification. It should be appreciated that such terms can refer to human entities or automated components supported through artificial intelligence (e.g., a capacity to make inference based on complex mathematical formalisms) which can provide simulated vision, sound recognition and so forth.

Multi-technology devices typically have fixed or operator-defined technology preference settings, which generally prefer new networks to all others; without determining which network is best suited for the customer or desired service. Conventionally, technology preferences have been controlled based on RF signal strength, interference, and fixed or operator-defined parameters broadcast in system messages or stored in the user equipment (UE). The systems and methods disclosed herein provide a dynamic per-call and/or per-application based selection of technology. Further, embodiments disclosed herein provide selection of technology based in part on an end-to-end performance of the cellular system prior to call set-up.

Aspects, features, or advantages of the subject innovation can be exploited in substantially any wireless communication technology; e.g., WiFi, Worldwide Interoperability for Microwave Access (WiMAX), Enhanced General Packet Radio Service (Enhanced GPRS), Global System for Mobile Communications (GSM), Universal Mobile Telecommunications System (UMTS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates delivery of a high-quality communication session, based in part on end-to-end network conditions, such as, but not limited to, available bandwidth, instantaneous load on the serving network, network delay, jitter, etc. Typically, the system 100 can include a network selection component 102, for example, within a UE 104, which can be utilized to dynamically identify a preferred domain/technology that can be employed for communication established with/by UE 104. Moreover, the domain/technology can be dynamically determined on a per call and/or per application basis.

In particular, next generation networks are moving towards new technologies, for example, Voice over Internet Protocol (VoIP), that utilize packet based communication protocols. Real-time communication, such as, but not limited to voice calls, is extremely susceptible to delay, jitter, and other impairments which may be caused by low capacity, high load, Quality of Service (QoS) settings, or other factors on the network. Conventional UEs that select a particular technology for real-time communication based on radio conditions alone can provide a lower-quality service than an alternate technology call with less optimum radio conditions if backhaul performance is not optimal. In contrast, UE 104, disclosed herein, performs a proactive latency-based end-to-end technology survey, to select an appropriate technology for a particular call and/or application.

Typically, UE 104 can include most any multi technology communication device employed by a subscriber, such as, but not limited to, a cellular phone, a personal digital assistant (PDA), a laptop, a personal computer, a media player, a gaming console, and the like. Moreover, the multi-technology UE 104 can connect to a plurality of networks, including, but not limited to WiFi, WiMAX, LTE, UMTS, HSPA, Bluetooth®, femto networks, etc.

According to one aspect, the UE 104 can test an end-to-end response of a network, prior to the selection of the service for a particular application. For example, the UE 104 can utilize any loop back measurement designed to test network latency, throughput, bandwidth, etc. (e.g., a ping signal) prior to establishing a voice call (and/or any other real-time communication session). Based on the test results, the network selection component 102 can select appropriate technologies for different applications and/or services based on application requirements, UE 104 and network infrastructure capabilities, network load, concurrent uses, user preferences, or other factors as determined by the service provider.

In one aspect, the network selection component 102 can compare the results of the test with a set of parameters, for example, predefined by the service provider. In another aspect, the UE 104 can test the response of a plurality of networks and the network selection component 102 can compare the results of each test to identify a technology for communication. Moreover, the UE 104 can perform the network test periodically, prior to establishing a call with the UE 104, during a call at the UE 104, and/or at most any specific time set by the network operator.

System 100 can further include a network utilization component 106 that can employ the selected technology for initiating communication with the UE 104. In one aspect, the network utilization component 106 can be implemented within the UE 104 and can ensure that communication, such as, but not limited to, voice calls, originating from and/or directed to the UE 104 can employ the selected technology for communication. For outgoing calls, the UE 104 can perform the network response test prior to establishing the call, such that the network selection component 102 can select an appropriate network and the network utilization component 106 can employ the selected network for the outgoing call. Further, for incoming calls, the network selection component 102 can select an appropriate network based on the results from the periodic measurement by the UE 104 and the network utilization component 106 can employ the selected network for the incoming call.

Figure 2:
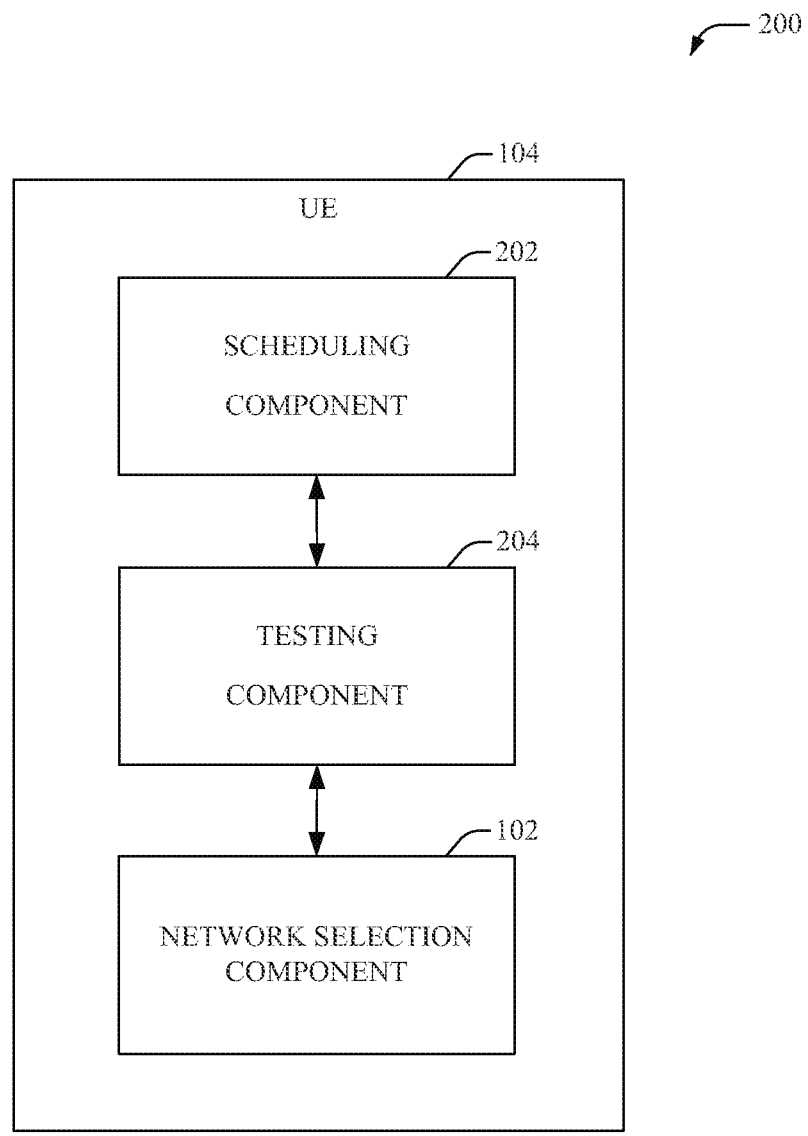
FIG. 2 illustrates an example system that can be employed to dynamically select a communication technology for a particular communication session and/or application.

Referring to FIG. 2, there illustrated is an example system 200 that can be employed to dynamically select a communication technology for a particular communication session and/or application, according to an aspect of the subject innovation. In particular, system 200 initiates communication to/from the UE 104 by employing the selected communication technology. It can be appreciated that the network selection component 102 and UE 104 can include functionality, as more fully described herein, for example, with regard to system 100.

In one aspect, system 200 can include a scheduling component 202 that can determine when a network response test can be initiated. In one example, the scheduling component 202 can monitor communication with the UE 104 and identify when a communication e.g., voice call, gaming session, etc. is initiated, for example by a subscriber (e.g., when the subscriber dials a phone number to place an audio and/or video call). When determined that a communication session, for example, a real-time communication session, is being established, the scheduling component 202 can initiate a network response test. In another example, the scheduling component 202 can initiate the network response test periodically (e.g., once every hour, 30 minutes, etc.) and/or at any specific time, for example, set by a network operator and/or subscriber. For example, the scheduling component 202 can initiate a network response test periodically, when the UE 104 is camping on a cell to assess whether conditions have changed (for better or for worse), necessitating a change in service (e.g., between access technologies or transport methodologies) for applications or classes of applications. Additionally or alternately, the scheduling component 202 can also schedule the network response test (e.g., to be performed in the background) during a communication session, for example, on receipt of "aged packets", described in detail infra.

According to an embodiment, when the scheduling component 202 initiates a network response test, a testing component 204 can employ a loop back measurement designed to test network latency, throughput, bandwidth, etc. of a network. For example, when the UE 104 encounters a new cell in the idle mode, and the scheduling component 202 identifies a Femtocell, WiFi access point, eNodeB, NodeB and/or other wireless technology used to provide services, the testing component 204 can launch a "ping" session between the UE and a ping client co-located with an access controller, a Radio Network Controller (RNC), a Serving GPRS Support Node (SGSN), or similar core node in order to assess the delay in the network. In another example, during peer-to-peer (P2P) communication, the ping client can also be co-located within a disparate UE. Upon receiving the response from the ping client, the testing component 204 can receive and/or compute measurements, such as, but not limited to, the Round Trip Time (RTT), jitter, packet loss, noise level, or other metrics determined by the service provider, and deliver the measurements to the network selection component 102.

Typically, the network selection component 102 can compare the measurements to a set of pre-established parameters, for example specified by the network operator. Based on the comparison the network selection component 102 can determine which services can be employed to support an application at a particular location, or whether fallback to another technology provides better quality or efficiency. In one aspect, the UE 104 can survey all of the available services and/or technologies (e.g., by performing the loop back measurement by employing the testing component 204) in order to differentiate the performance potential of the available services and/or technologies and determine which service/technology is appropriate for available applications. Moreover, the network selection component 102 can select a service/technology that provides the best Quality of Service (QoS) for the available applications at a particular UE location and/or particular time.

For example, a UE 104 with an LTE capability can have options of placing a voice call either on the LTE technology, which utilizes Von', or on UMTS technology, which utilizes a circuit switched protocol. Since UEs generally prefer newer technologies, due to their advantages over older technologies, the UE 104 can initially check the LTE network response and send out a ping (e.g., by employing the testing component 204) to verify latency before a call is set up. The network selection component 102 can analyze the measurements received, for example by comparing with operator-defined parameters. If the latency is within an acceptable range defined by the parameters and/or below a threshold defined by the parameters, the UE 104 can utilize the LTE network to place the call (e.g., by employing the network utilization component 106. However, if the latency (and/or any other measurement is outside the acceptable range (and/or above the threshold) the UE 104 can change services, e.g. change to a UMTS network; and initiate a circuit switched voice call that can provide better service for the voice call to the subscriber.

In one aspect, the system 200 can also be employed in a reactive mode. For example, if during a call, data session or other application the scheduling component 202 identifies "aged packets", the scheduling component 202 can determine that a background ping session can be initiated. The testing component 204 can transmit a ping signal to a ping client at a core node of the communication network to verify whether the aged packets are caused within the communication network. In the event that service degradation is within the communication network, a scan of available alternate access and transport technologies can be conducted by the UE 104 (e.g. by the testing component 204). Further, change of technology on the existing service or an Inter-Radio Access Technology (IRAT) handover can be initiated if the network selection component 102 determines that the service quality can improve on the new technology. In this example scenario, the UE 104 can perform an in-call handover or revised network selection after the in-progress call is connected. In another example, when the UE 104 determines a cell or access point cannot support an application at the appropriate quality, the testing component 204 can be employed to signal the ping client located at the core node, which can trigger an application layer performance indicator.

Figure 3:
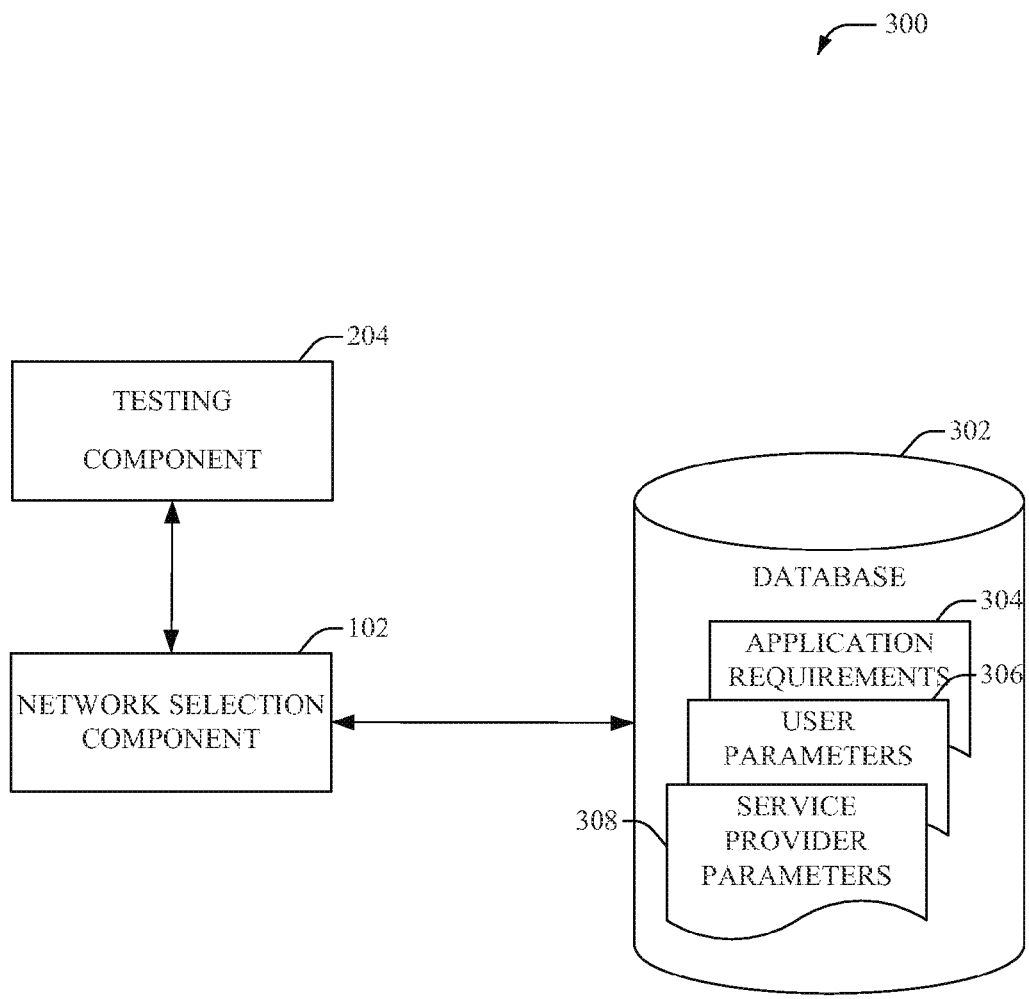
FIG. 3 illustrates an example system that can ascertain an ability of a network to support a high quality real-time communication session, before the communication session is established.

FIG. 3 illustrates an example system 300 that can ascertain an ability of a network to support a high quality real-time communication session, before the communication session is established. Real-time communication sessions can include a voice call, video call, a live gaming session, or most any communication that is typically more sensitive and/or susceptible to jitter and/or latency than a data call (e.g. a best effort data call for browsing). Moreover, system 300 enables a UE to be aware of jitter/latency conditions in the network before a communication session is established, such that latency/jitter effects, which include, but are not limited to, dropped packets, voice quality issues, delay, difficulty with the conversation due to the delay, can be avoided. Although not shown explicitly, it can be appreciated that the system 300 can be included within a UE. Further, it can be appreciated that the testing component 204 and the network selection component 102 can include functionality, as more fully described herein, for example, with regard to systems 100 and 200.

In one aspect, the testing component 204 can perform an end-to-end network response test to measure factors, such as, but not limited to, latency, jitter, bandwidth, congestion, traffic, throughput, etc. As an example, the testing component 204 can transmit a ping signal to a ping client within a core network node and/or an end device (e.g., in P2P applications). Typically, the core network node can include, but is not limited to, an access controller, a RNC, a SGSN, a femto gateway (FGW) or the like. Further, the end device can include most any communication device, such as, but not limited to a media player, a digital camera, a media recorder, a laptop, a cell phone, a PDA (personal digital assistant), a personal computers, a printer, a scanner, a digital photo frame, a GPS module, a gaming module, etc. Furthermore, the end device can also include, but is not limited to, most any LTE-based appliances that can employed, for example, in a home, office, building, retail store, restaurant, hotel, factory, warehouse, etc., such as, but not limited to, heating or cooling unit, lighting unit, washing machine, dryer, dishwasher, refrigerator, oven, etc.

As an example, the ping signal can be transmitted over most any network (e.g., LTE, WiFi, etc.). Specifically, the ping signal can be a two-stage ping, wherein a first ping can be transmitted by the testing component 204 to establish a bearer and a second ping can be transmitted by employing the bearer to facilitate network response measurement. In response to the ping signal, the testing component 204 can receive a ping echo, for example, transmitted back from the core network node and/or end device. The network selection component 102 can calculate metrics, such as, but not limited to, RTT, jitter, packet loss, noise level, etc., based on the ping echo. In one aspect, the network selection component 102 can determine service success criteria based on a comparison of the metrics with a set of parameters stored in a database 302.

Moreover, database 302 can store predefined criteria that facilitate the determination of service success. For example, database 302 can include application requirements 304, user specified parameters 306 (e.g. user preferences provided by a subscriber), and/or service provider parameters 308 (e.g. preferences provided by a network operator). In one aspect, the service provider parameters 308 can be transmitted to the UE, for example, over a macro network, in a broadcast message. Moreover, the network operator can set one or more service provider parameters 308 and deliver them to UEs that are capable of proactive latency-based end-to-end technology survey and fallback, as part of the normal operations parameters, for example, during provisioning or at any other time. Typically, the network operator can communicate, via the network infrastructure, the survey success criteria for all services and applications that the UE is capable of, for example, based on UE capability, subscribed applications, network technology, and other factors under operator control, in the broadcast message. In one example, the one or more service provider parameters 308 can be delivered by an IP multimedia subsystem (IMS), when the UE registers on the IMS, as part of a registration process.

In one example, the requirements and/or parameters stored in database 302 can provide acceptable ranges and/or thresholds for one or more measured metrics. The network selection component 102 can compare the calculated metrics with the information in database 302 to determine whether the tested network can be utilized for communication, or whether an alternate method, technology, or access point can be chosen to improve service quality. In one aspect, the information in database 302 can specify a default method, technology, and/or access point that can be chosen by the network selection component 102, if the calculated metrics are outside the acceptable ranges and/or thresholds. In another aspect, the testing component 204 can perform a survey on each available technology and select a method, technology, and/or access point, which provides the best metrics (e.g., highest service quality).

Accordingly, the network selection component 102 can identify a method, technology, and/or access point that can be utilized for a particular communication session and/or application. Moreover, utilization of the identified method, technology, and/or access point can improve a customer's perception of the service provided by the network operator, while allowing the network operator to aggressively deploy efficient and robust technologies. By dynamically changing the criteria, for example, service provider parameters 308, against which the survey results are compared, the network operator can shift traffic between technologies or services as efficiency, capacity, and/or other network requirements change.

It can be appreciated that the database 302 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 4:
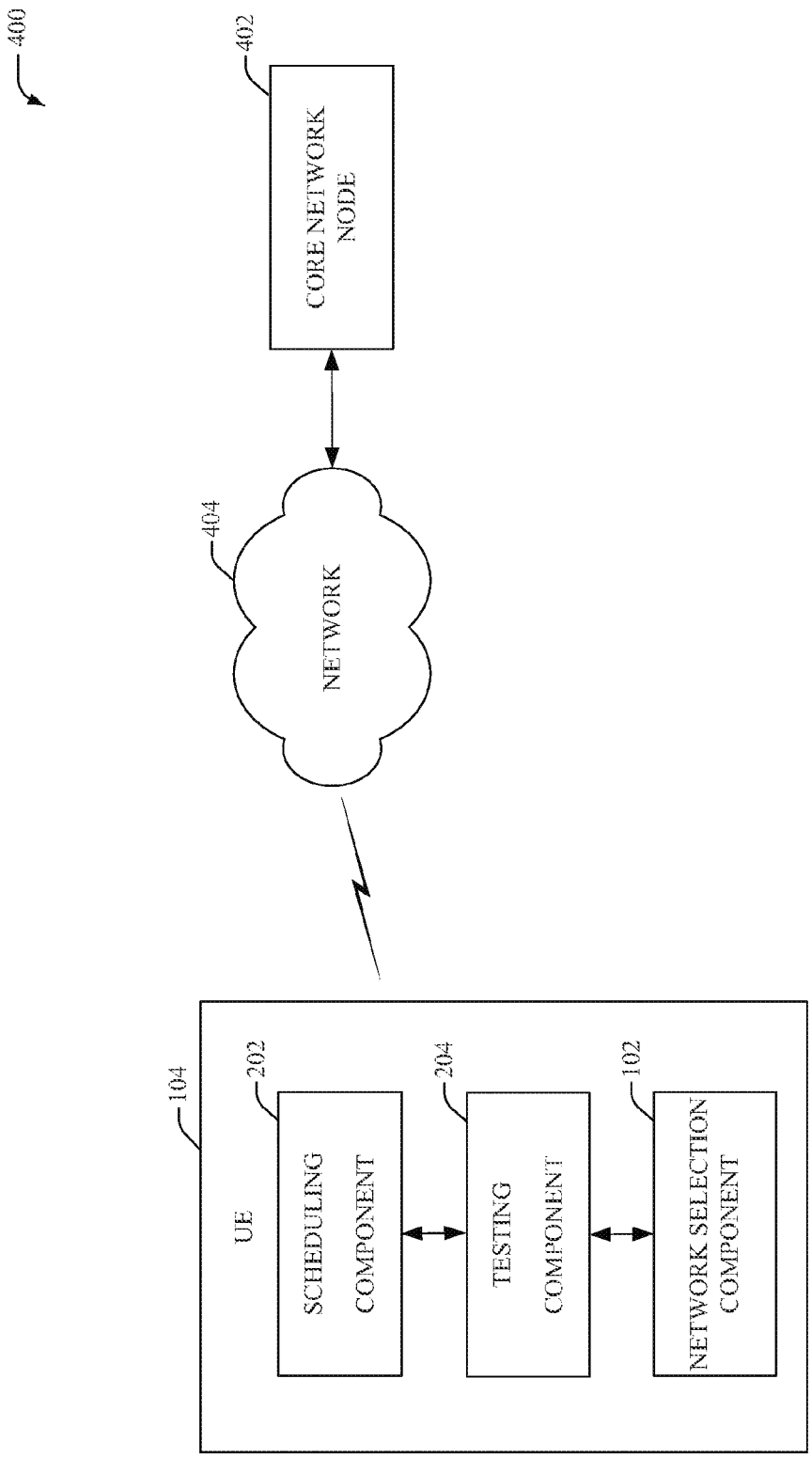
FIG. 4 illustrates an example system that performs an end-to-end technology survey through an infrastructure network.

Referring now to FIG. 4, there illustrated is an example system 400 that performs an end-to-end technology survey through an infrastructure network, according to an aspect of the subject disclosure. Typically, conventional latency measurement methods cover a portion of the pipe and/or a portion of the path from one point to another but not the entire path end-to-end. In contrast, system 400 facilitates a dynamic and/or proactive determination of metrics, such as, but not limited to, latency, bandwidth, throughput, jitter, noise, etc. based on an end-to-end technology survey. It can be appreciated that the network selection component 102, scheduling component 202, testing component 204, and UE 104 can include respective functionality, as more fully described herein, for example, with regard to systems 100, 200, and 300.

At a scheduled time (e.g., determined by scheduling component 202) the testing component 204 can initiate the end-to-end technology survey. For example, the end-to-end technology survey can be initiated periodically and can provide an input that facilitates determination of a network that the UE 104 should camp on. Additionally or alternately, the end-to-end technology survey can be initiated on a per-call basis, such that a real-time latency in the bearer can be determined. For example, changes in network load, traffic, etc. can be identified prior to placing a voice call based in part on the per-call end-to-end technology survey.

Typically, the scheduling component 202 can optimize the end-to-end technology survey in a manner, such that, a call setup is not slowed down (reactive approach). Additionally or alternately, unnecessary measurements overhead and battery life impact can be reduced (e.g., by scheduling component 202) to further optimize the end-to-end technology survey (proactive approach). In one aspect, a validity factor and/or maximum age of survey measurements can be set based upon a mobility profile. For example, the mobility profile can include a number and/or rate of reselections and/or fading profile. In another aspect, survey measurements can last longer (and are refreshed less) if the UE 104 is stationary, but are repeated and/or refreshed more often if UE 104 is moving. Further, the scheduling component 202 can optimize the end-to-end technology survey based on user behavior prediction. For example, the scheduling component 202 can initiate survey measurements (e.g., performed by testing component 204) if the user interface on the UE 104 is switched to a voice application; and/or before the call dialing is completed. This approach can minimize unnecessary survey overhead and reduce the potential for delayed call setup whilst the UE 104 is reactively surveying.

According to an aspect, the testing component 204 can initiate a loop back measurement, for example, a ping signal to a ping client (not shown) within the core network node 402 of network 404. Typically, network 404 can include any wireless and/or wired communication network, such as, but not limited to GSM, UMTS, LTE, WiFi, Digital Subscriber Line (DSL), etc. and the core network node 402 can include, but is not limited to, an access controller, access point, RNC, SGSN, or similar core node within the network 404. Although, FIG. 4 illustrates the ping signal being transmitted between the UE 104 and network 404 over a wireless link, it can be appreciated that the ping signal and/or communication session can be transmitted over a wired link.

Further, the testing component 204 can receive a ping echo from the core network node 402 and the network selection component 102 can determine performance metrics, such as, but not limited to RTT, jitter, packet loss, noise level, etc. Moreover, the network selection component 102 can ascertain the ability of the network 404 to support the voice call and can determine whether fallback to a different technology is required to support the voice call.

In one aspect, the UE 104 can report the results of the end-to-end technology survey to the network 404 in a message via the most any appropriate service, as configured by the network operator. It can be appreciated that the service selection criteria, survey frequency, reporting method, performance indicators, rule sets for network selection, selection order, reselection, and/or fallback can each be dynamically configurable under network operator control as UE location, system load, and/or other factors change. As an example, the UE 104 can return measured latency information to the core network node 402 via network 404. The core network node 402 can utilize the information to for various network management mechanisms, such as, but not limited to, load balancing, rerouting traffic, and/or update a Key Performance Indicator (KPI), such that the network 404 can be aware of its performance from a user perspective.

According to another aspect, the UE 104 can perform an optimal routing mechanism based on the results of the end-to-end technology survey. For example, the testing component 204 can perform the end-to-end technology survey on a plurality of available networks (not shown) and the network selection component 102 can analyze the results of the endto-end technology survey to select an optimal method, technology, and/or access point for establishing the voice call. For example, if there are multiple networks that can support the voice call, e.g. WiFi, LTE, HSPA+, testing component 204 can perform an end-to-end technology survey (e.g., ping) on each technology and the network selection component 102 can determine a ranked list of technologies/networks for establishing the voice call. The ranking can be indicative of various performance metrics, such as, but not limited to, latency, jitter, noise, traffic, etc., which can be employed by the network selection component 102 to select a technology/network prior to placing the voice call. In another example, the UE 104 can ping (e.g., by employing the testing component 204) a DSL and cable modem technology in a location, for determining which technology is better suited for a communication session associated with the UE 104. Typically, a path with the lowest latency is the most efficient, since a lower latency indicates a fewer number of network elements and/or transport paths between the UEs.

Figure 5:
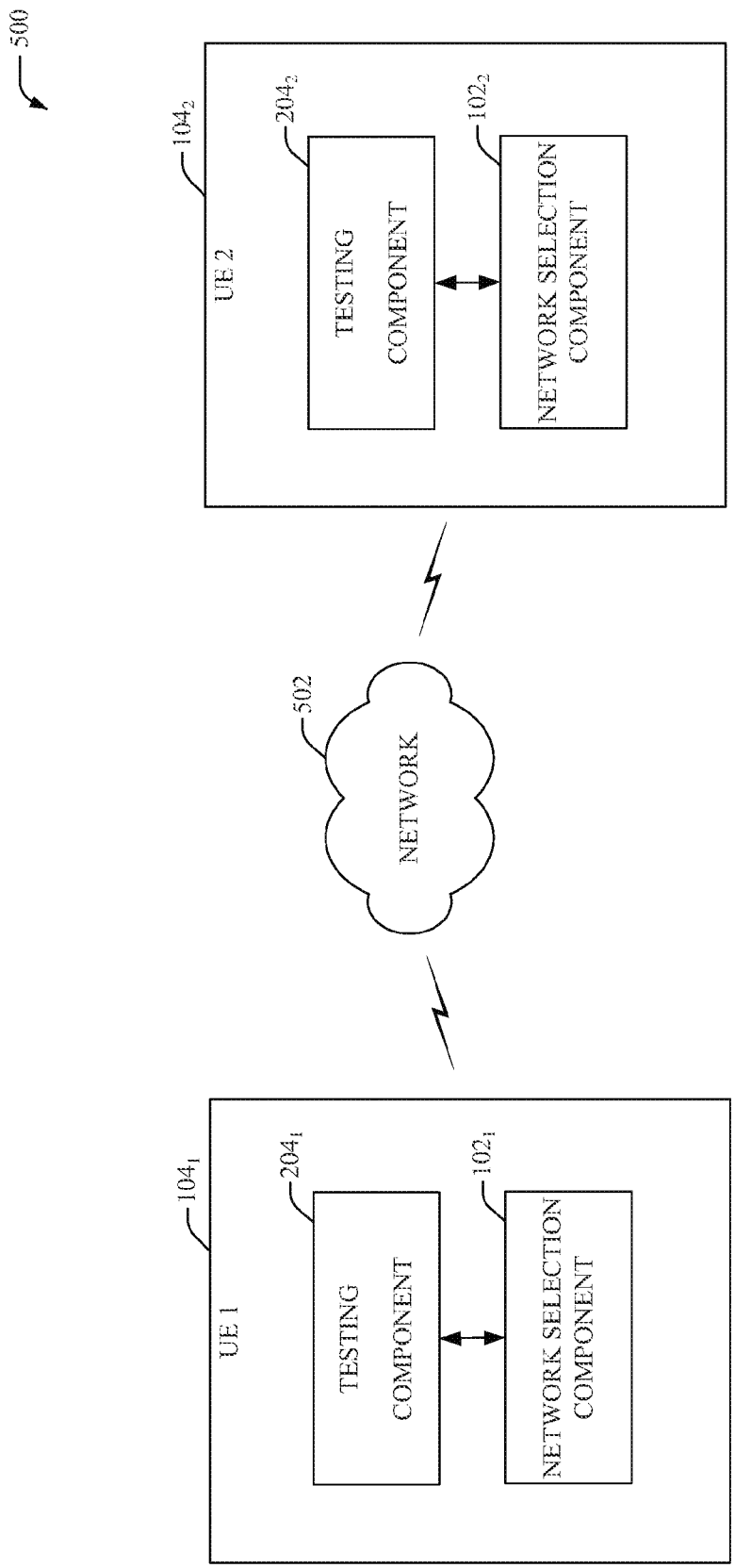
FIG. 5 illustrates an example system that performs a proactive latency based end-to-end technology survey between two UEs for peer-to-peer (P2P) applications.

FIG. 5 illustrates an example system 500 that performs a proactive latency based end-to-end technology survey between two UEs for P2P applications. It can be appreciated that the network selection components ($102_1$, $102_2$), testing components ($204_1$, $204_2$), and UEs ($104_1$, $104_2$) can be substantially similar to network selection component 102, testing component 204, and UE 104 respectively, which are more fully described herein, for example, with regard to systems 100, 200, 300 and 400. Further, network 502 can include UMTS, GSM, LTE, WiFi, WiMAX, EV-DO, CDMA, Bluetooth®, etc.

According to an aspect, during P2P applications, e.g., gaming, performance metrics, for example, latency, noise, jitter, etc. can be determined by performing an end-to-end technology survey between the two end devices, e.g., UEs ($104_1$, $104_2$). In one aspect, both the testing components ($204_1$, $204_2$) can perform loop back measurements based on the end-to-end technology survey and facilitate determination of whether network 502 can support the P2P application or whether fallback to another network (not shown) can be performed, prior to initiating the P2P application. In another aspect, testing components ($204_1$, $204_2$) can perform loop back measurements on a plurality of available networks (not shown) including network 502 to determine the best network for the P2P application (e.g., based in part on application requirements). For example, testing components ($204_1$, $204_2$) can ping multiple networks available to the UEs ($104_1$, $104_2$), for example, Bluetooth®, WiFi, UMTS, LTE, etc. prior to establishing a P2P gaming session between the UEs ($104_1$, $104_2$). Based in part on the ping results, the network selection components ($102_1$, $102_2$) can determine the best network peer to minimize latency before the UEs ($104_1$, $104_2$) start the game.

Figure 6:
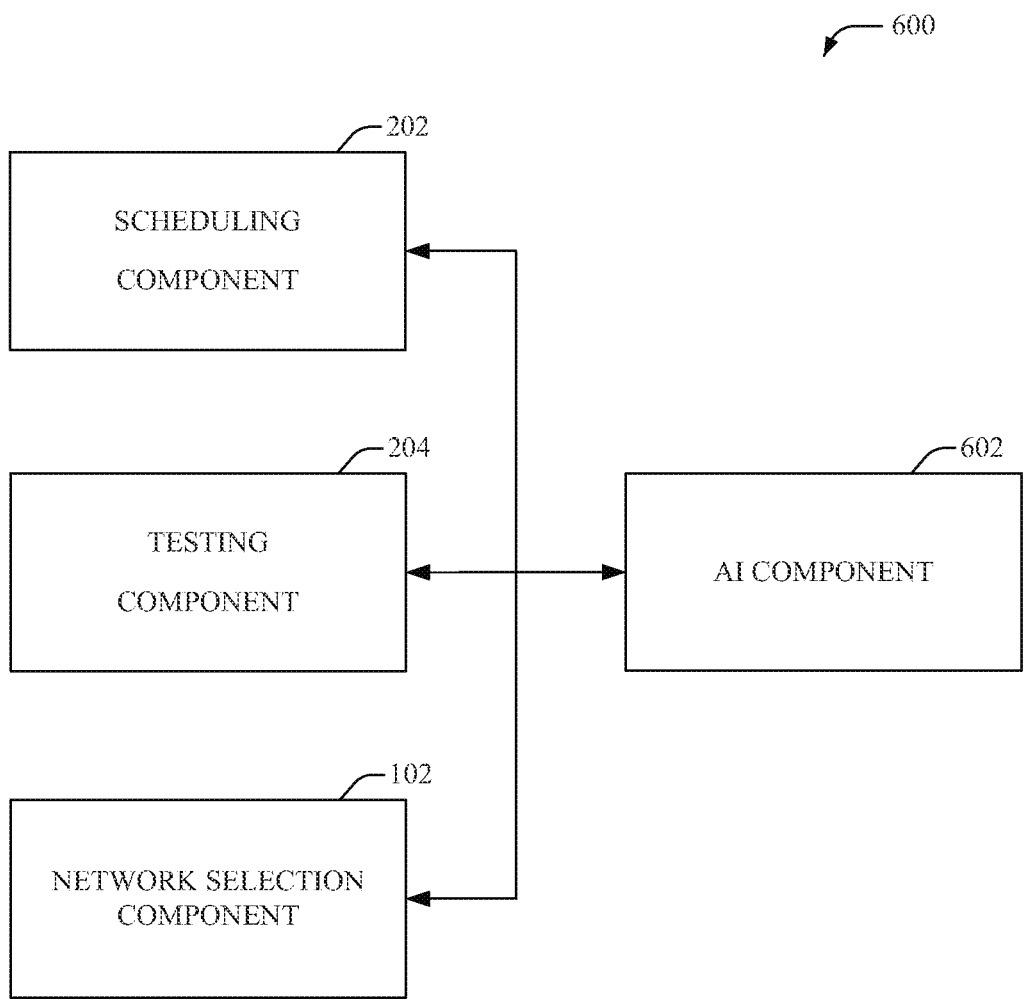
FIG. 6 illustrates an example system that facilitates automating one or more features in accordance with the subject innovation.

FIG. 6 illustrates a system 600 that employs an artificial intelligence (AI) component 602, which facilitates automating one or more features in accordance with the subject innovation. It can be appreciated that the network selection component 102, scheduling component 202, and testing component 204 can include respective functionality, as more fully described herein, for example, with regard to systems 100-500.

The subject innovation (e.g., in connection with technology/network selection) can employ various AI-based schemes for carrying out various aspects thereof. For example, a process for determining when a ping signal can be initiated, when fallback can be performed, and/or which technology/network can be selected for communication, etc. can be facilitated via an automatic classifier system and process.

Moreover, where the UE can operate in multiple technologies/networks, the classifier can be employed to determine which technology/network can be selected for initiating communications associated with the UE.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information stored in the database 302 (FIG. 3) or other data-specific attributes derived from the stored information, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when the UE is likely to initiate a voice call and/or a real-time communication session, which of the available technologies/networks can be utilized for the voice call and/or a real-time communication session, etc. The criteria can include, but is not limited to, historical patterns, user behavior, location of the UE, parameters defined by a network operator, application preferences, time, date, etc.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
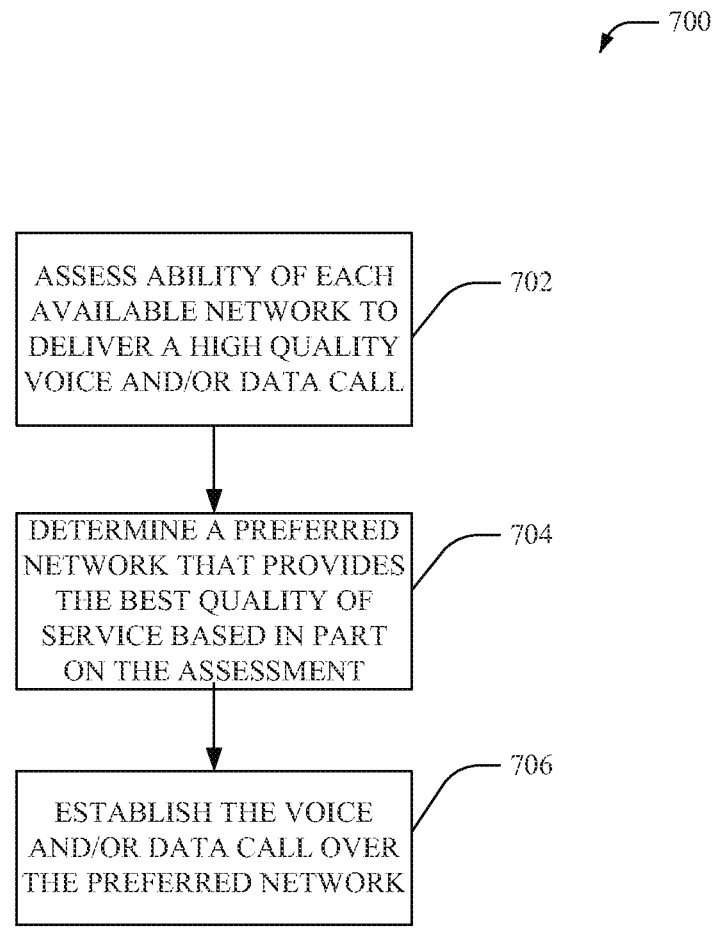
FIG. 7 illustrates an example methodology that facilitates a proactive latency-based end-to-end technology survey and fallback for mobile telephony.

Referring now to FIG. 7, illustrated is an example methodology 700 that facilitates a proactive latency-based end-to-end technology survey and fallback for mobile telephony in accordance with an aspect of the subject disclosure. Typically, the technology survey can be performed periodically, prior to establishing a high quality communication session and/or during a high quality communication session. For example, a high quality communication session can include a voice call, a video call, a real-time communication session, a high quality data call, etc. In one aspect, a UE can establish the high quality communication session over one of a plurality of technologies/networks. At 702, the ability of each available network (e.g., available to the UE) to deliver a high quality voice and/or data call can be assessed. Moreover, the condition and/or availability of the backhaul circuits that carry the calls from the base station to the terrestrial telephone network can also be determined. In one aspect, the ability of all available wireless access nodes, (e.g., Femtocell, eNodeB, NodeB, or other access point) can be assessed based in part on current network conditions such as, but not limited to, available bandwidth, instantaneous load on the serving broadband network, network delay, jitter, and/or other factors.

At 704, a preferred network that provides the best end-to-end QoS can be determined based in part on the assessment. In addition, factors including application preferences, user preferences, service provider preferences, etc. can be utilized to determine the preferred network. Further, at 706, the voice and/or data call can be established over the preferred network.

Figure 8:
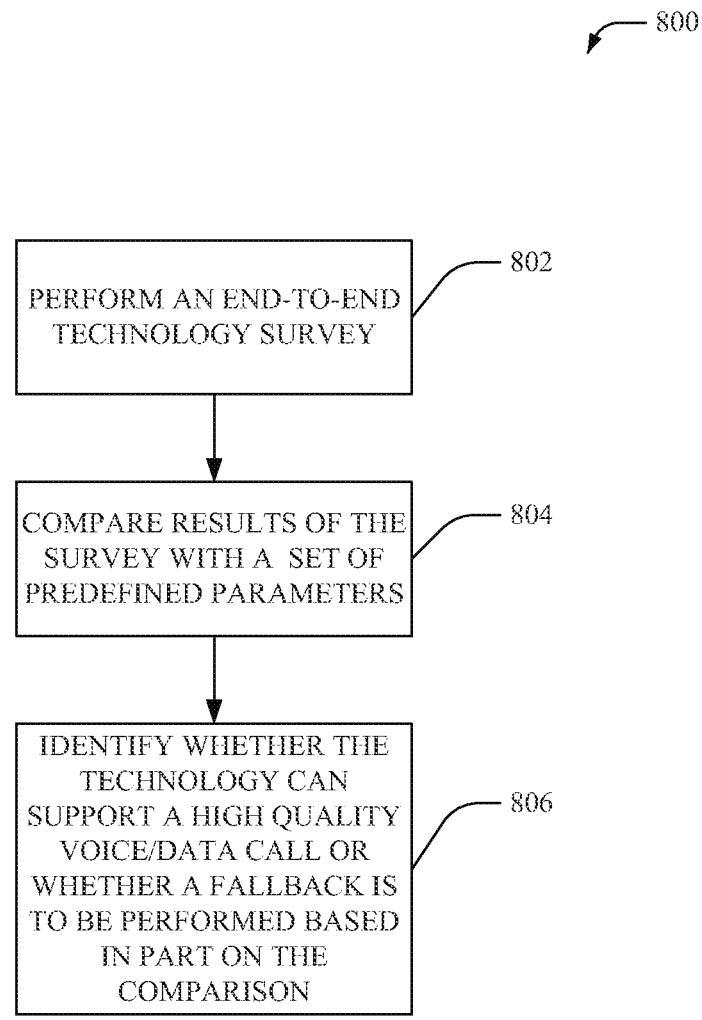
FIG. 8 illustrates an example methodology that determines whether fallback to another technology is to be performed for establishing a communication session.

FIG. 8 illustrates an example methodology 800 that determines whether a fallback from one technology to another is to be performed for establishing a communication session, according to an aspect of the subject specification. In particular, methodology 800 facilitates determination of whether fallback to another technology provides better quality or efficiency for a particular communication session and/or application. For example, the methodology 800 can be employed periodically (e.g., by a UE camping on a cell) to asses whether conditions have changed (for better or for worse), necessitating a change in service (between access technologies or transport methodologies) for applications and/or classes of applications.

At 802, an end-to-end technology survey can be performed. Typically, the end-to-end technology survey can include most any loop back measurement designed to test network latency, throughput, bandwidth, noise, jitter, etc. Moreover, the measurement can be through an infrastructure network or peer-to-peer, between two UEs. For example, when the UE encounters a new cell in the idle mode, and it identifies a Femtocell, WiFi access point, eNodeB, NodeB and/or other wireless technology used to provide services, a "ping" session between the UE and a ping client co-located with the access controller, AP, RNC, SGSN, or substantially similar core node can be performed for determining the delay in the network. In another example, the "ping" session can be initiated between ping clients within two UEs, for example, in a peer-to-peer communication session. At 804, the results of the survey can be compared with a set of predefined parameters. For example, on receiving a response from the ping client, the UE can determine parameters, such as, but not limited to, RTT, jitter, packet loss, noise level, and/or other metrics with predefined values set by the service provider. In one aspect, the predefined parameters can be broadcast, over wireless and/or wired communication, by employing a dedicated channel and/or signal, via SMS messaging, via application layer messaging, etc.

At 806, it can be identified whether the technology can support a high quality voice and/or data call (including video session, gaining session, and/or most any real-time application, etc.), based in part on the comparison. Moreover, if determined that the technology cannot support the high quality voice and/or data call a fallback to a disparate technology, which can support the call, can be performed.

Figure 9:
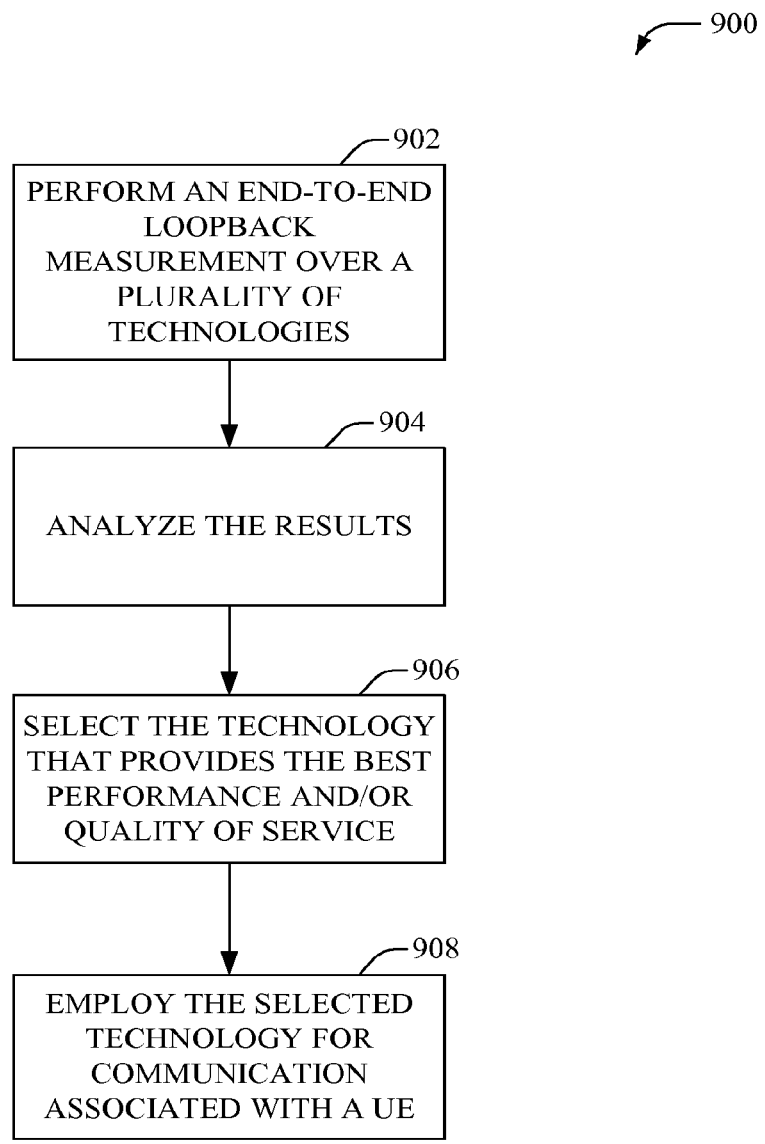
FIG. 9 illustrates an example methodology that facilitates dynamic and proactive selection of a communication technology for a particular communication session and/or application.

FIG. 9 illustrates an example methodology 900 that facilitates dynamic and proactive selection of a communication technology for a particular communication session and/or application. Typically, methodology 900 can be utilized to identify an optimal routing mechanism and dynamically select a technology/network for communication, based on the quality of service provided by that technology/network in real-time. For example, if a UE can communicate over multiple networks, e.g. WiFi, LTE, UMTS, HSPA+, then prior to placing a call (voice and/or data), the best network for a particular call and/or application can be selected.

At 902, an end-to-end loopback measurement can be performed over a plurality of technologies. For example, a ping signal can be transmitted and ping echo can be received via each of the plurality of technologies. In one aspect, various factor, such as, but not limited to, RTT, noise level, jitter, bandwidth, traffic, congestion, etc. can be measured. At 904, the results of the loopback measurement can be analyzed. For example, a ranked list of technologies based on their performance and/or QoS can be determined. At 906, the technology that provides the best performance and/or QoS can be selected. Further, at 908, the selected technology can be employed for communication associated with a UE.

Figure 10:
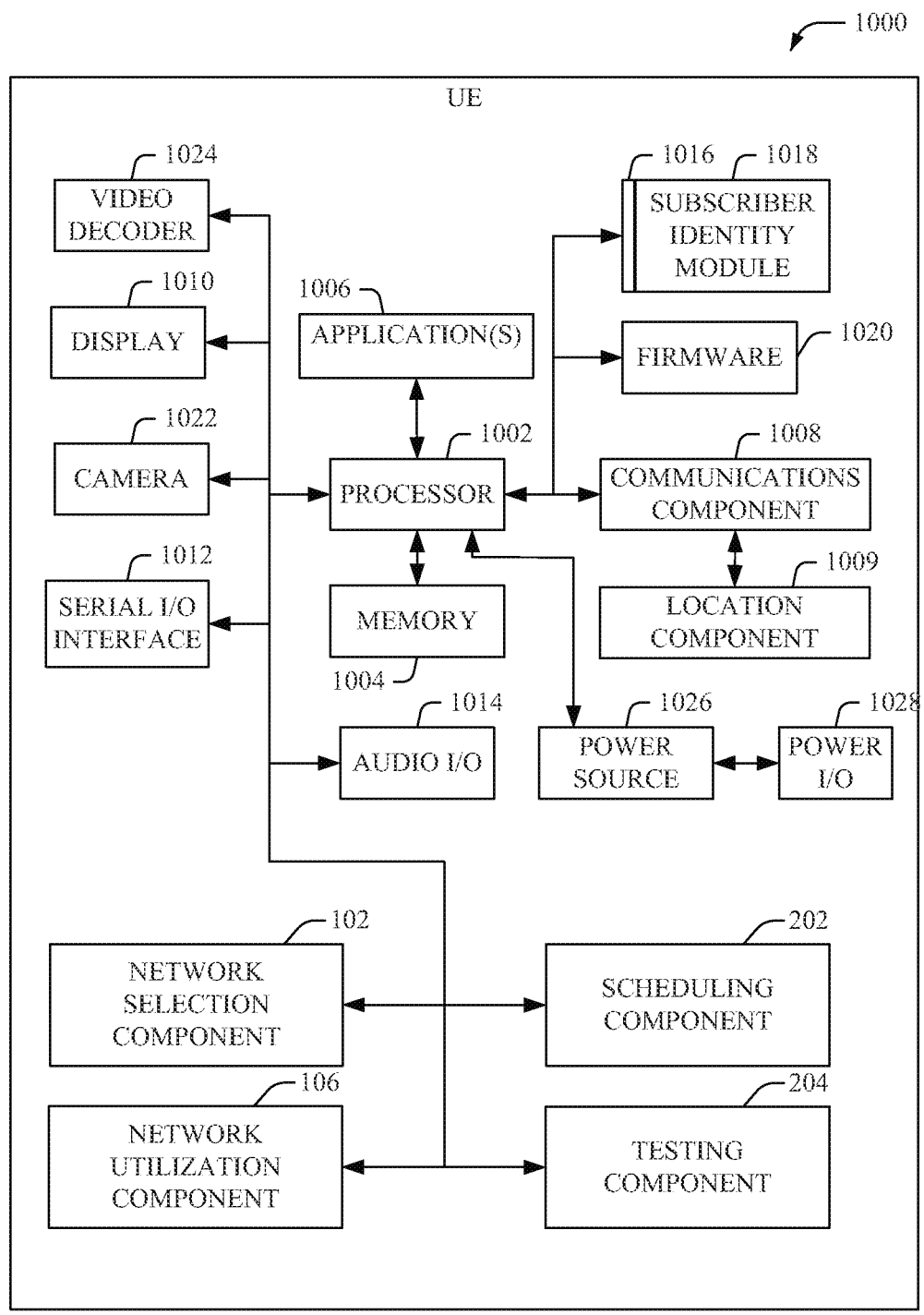
FIG. 10 illustrates a block diagram of a UE suitable for dynamic technology selection in accordance with the innovation.

Referring now to FIG. 10, there is illustrated a block diagram of a UE 1000 suitable for domain selection in accordance with the innovation. The UE 1000 can include a processor 1002 for controlling all onboard operations and processes. A memory 1004 can interface to the processor 1002 for storage of data and one or more applications 1006 being executed by the processor 1002. A communications component 1008 can interface to the processor 1002 to facilitate wired/wireless communication with external systems (e.g., femtocell and macro cell). The communications component 1008 interfaces to a location component 1009 (e.g., GPS transceiver) that can facilitate location detection of the UE 1000. Note that the location component 1009 can also be included as part of the communications component 1008.

The UE 1000 can include a display 1010 for displaying content downloaded and/or for displaying text information related to operating and using the device features. A serial I/O interface 1012 is provided in communication with the processor 1002 to facilitate serial communication (e.g., USB, and/or IEEE 1394) via a hardwire connection. Audio capabilities are provided with an audio I/O component 1014, which can include a speaker for the output of audio signals related to, for example, recorded data or telephony voice data, and a microphone for inputting voice signals for recording and/or telephone conversations.

The device 1000 can include a slot interface 1016 for accommodating a subscriber identity module (SIM) 1018. Firmware 1020 is also provided to store and provide to the processor 1002 startup and operational data. The UE 1000 can also include an image capture component 1022 such as a camera and/or a video decoder 1024 for decoding encoded multimedia content. The UE 1000 can also include a power source 1026 in the form of batteries, which power source 1026 interfaces to an external power system or charging equipment via a power I/O component 1028. In addition, the UE 1000 can include a network selection component 102, network utilization component 106, scheduling component 202, and testing component 204, which can include respective functionality, as more fully described herein, for example, with regard to systems 100-600.

Figure 11:
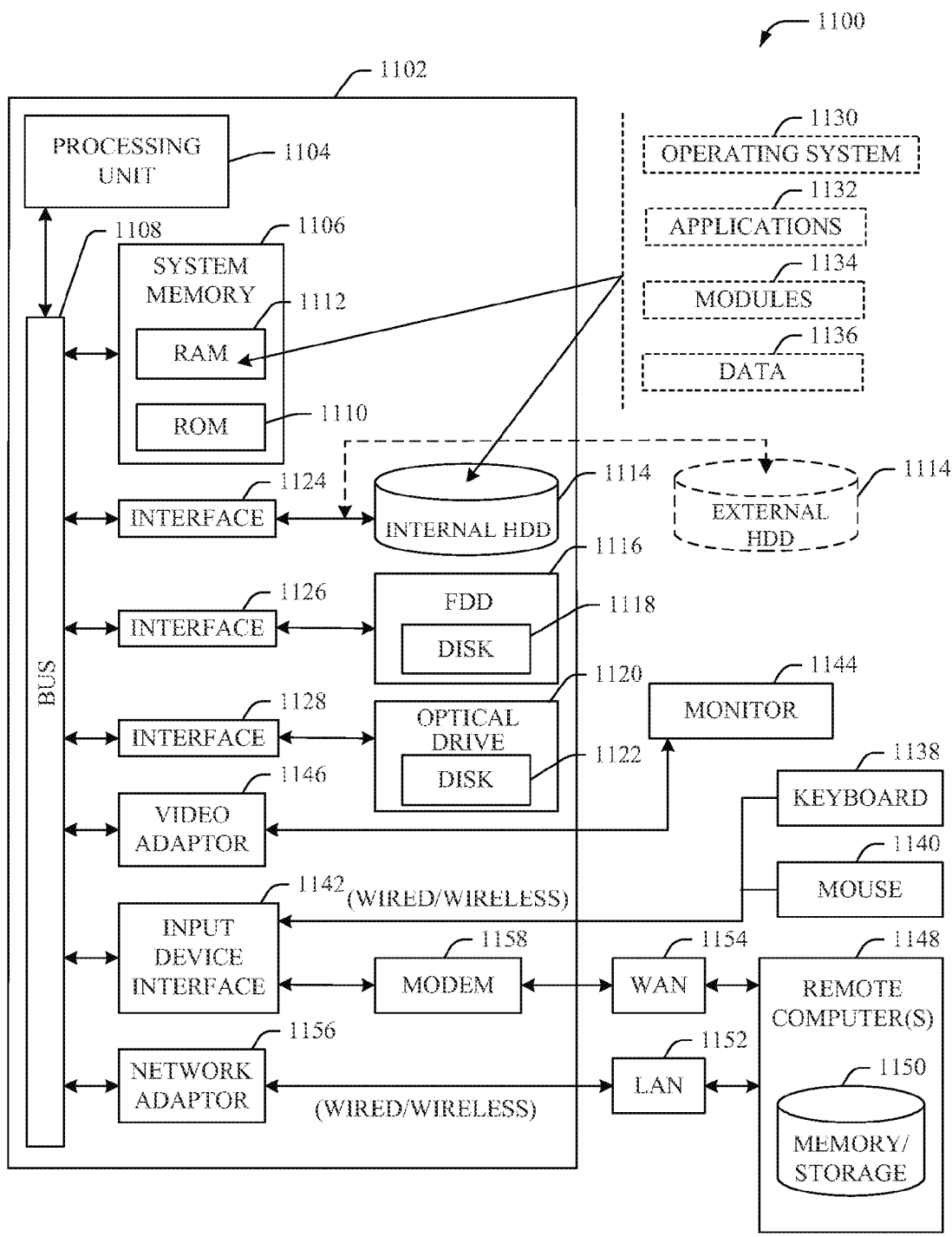
FIG. 11 illustrates a block diagram of a computer operable to execute the disclosed communication architecture.

Referring now to FIG. 11, there is illustrated a block diagram of a computer operable to execute the disclosed communication architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory to store computer-executable instructions; and
   a processor, communicatively coupled to the memory, that facilitates execution of the computer-executable instructions to perform operations comprising:
   in response to determining that a data packet related to a communication session established by a user equipment via a first set of network devices of a first communication network has been delayed, initiating a first end-to-end survey by directing a ping signal from the user equipment to a device at which the communication session terminates via a backhaul link that couples a radio access point device of the first communication network with the device, wherein the first end-to-end survey is a survey of a communication path between the user equipment at which the communication session begins and the device at which the communication session terminates;
   based on a comparison of first result data indicative of a first result of the first end-to-end survey with survey data indicative of a survey criterion associated with an application determined to be subscribed to by the user equipment, initiating an inter-radio access technology transfer to resume the communication session via a second set of network devices of a second communication network that is different than the first communication network, wherein the initiating the inter-radio access technology transfer comprises initiating the inter-radio access technology transfer in response to a determination that the second communication network provides a first service quality that is greater than a second service quality provided by the first communication network and wherein the survey data is received by the user equipment from an internet protocol multimedia subsystem network device of the first communication network during a registration of the user equipment with the internet protocol multimedia subsystem network device; and based on initiating a second end-to-end survey after a time period that is determined based on motion data indicative of a speed of the user equipment, directing, from the user equipment to a network management device of the second set of network devices, second result data indicative of a second result of the second end-to-end survey to facilitate a modification of key performance indicator data.

2. The system of claim 1, wherein the directing the ping signal comprises facilitating a first transmission of a first ping signal to establish a transmission bearer link and facilitating a second transmission of a second ping signal via the transmission bearer link to facilitate a network response measurement.

3. The system of claim 1, wherein the radio access point device is a first radio access point device, the communication session comprises a voice call, and the inter-radio access technology transfer comprises an in-call transfer of the user equipment from the first radio access point device to a second radio access point device of the second communication network.

4. The system of claim 1, wherein the operations further comprise increasing the time period in response to determining that the speed of the user equipment has decreased.

5. The system of claim 4, wherein the comparison comprises a determination that measurement data that is determined based on an echo of the ping signal fails to satisfy the survey criterion.

6. The system of claim 1, wherein the first result data comprises information representing packet loss during a transmission of the ping signal.

7. The system of claim 1, wherein the operations further comprise decreasing the time period in response to determining that the speed of the user equipment has increased.

8. The system of claim 1, wherein the survey data is received via a broadcast message.

9. The system of claim 1, wherein the first result data comprises information representing jitter during a transmission of the ping signal.

10. A method, comprising:
in response to determining a delay in receiving a data packet during a communication session associated with a user equipment via a first set of network devices of a first communication network, initiating, by a system comprising a processor, a first end-to-end survey via the first communication network comprising directing a ping signal from the user equipment at which the communication session begins to a device at which the communication session terminates via a backhaul link that facilitates a coupling of a radio access point device with the device;
based comparing first result data indicative of a first result of first the end-to-end survey with survey data indicative of a survey criterion associated with an application determined to be subscribed to by the user equipment that is received by the user equipment from an internet protocol multimedia subsystem network device of the first communication network during a registration of the user equipment with the internet protocol multimedia subsystem network device, facilitating, by the system, an inter-radio access technology transfer to resume the communication session via a second set of network devices of a second communication network that is different than the first communication network, wherein the facilitating comprises facilitating the inter-radio access technology transfer in response to a determination that the second communication network provides a first service quality that is greater than a second service quality provided by the first communication network; and based on a second end-to-end survey that is initiated after a time period that is determined based on motion data indicative of a speed of the user equipment, directing, by the system, second result data indicative of a second result of the second end-to-end survey from the user equipment to a network management device of the second set of network devices to facilitate a modification of information representing a key performance indicator.

11. The method of claim 10, further comprising:
based on the first end-to-end survey, determining, by the system, the first result data comprising determining information representing jitter during a transmission of the ping signal.

12. The method of claim 10, wherein the directing the ping signal comprises facilitating a first transmission of a first ping signal to establish a transmission link and facilitating a second transmission of a second ping signal by employing the transmission link to facilitate a network response measurement.

13. The method of claim 10, further comprising:
in response to determining that the speed of the user equipment has increased, decreasing, by the system, the time period.

14. The method of claim 10, further comprising:
based on the first end-to-end survey, determining, by the system, the first result data comprising determining latency data that represents a data transfer latency associated with the first set of network devices of the first communication network.

15. The method of claim 10, further comprising:
receiving, by the system, the survey data from the internet protocol multimedia subsystem network device via a text message.

16. The method of claim 10, further comprising:
directing, by the system, the second result data to the network management device to facilitate network management.

17. A non-transitory computer readable storage medium comprising computer-executable instructions that, in response to execution, cause a user equipment comprising a processor to perform operations, comprising:
in response to detecting a delay in receiving a data packet via a first set of network devices of a first communication network during a communication session that is initiated at the user equipment and based on directing a ping signal from the user equipment to a device at which the communication session terminates via a backhaul link that couples a radio access point device with the device, determining first information representing a first end-to-end network condition associated with the first communication network, wherein the first end-to-end network condition comprises a network condition associated with a communication path between the user equipment and the device;

based on a comparison of first information with survey data indicative of a survey criterion associated with an application determined to be subscribed to by the user equipment that is received by the user equipment from an internet protocol multimedia subsystem network device of the first communication network during a registration of the user equipment with the internet protocol multimedia subsystem network device, initiating an inter-radio access technology transfer that resumes the communication session via a second set of network devices of a second communication network that is different than the first communication network, wherein the initiating comprises initiating the inter-radio access technology transfer in response to a determination that a first service quality provided by the first communication network is less than a second service quality provided by the second communication network; and based on determining, after a time period that is determined based on motion data indicative of a speed of the user equipment, second information representing a second end-to-end network condition, directing, from the user equipment to a network management device of the second set of network devices, the second information to facilitate a update of key performance indicator data.

18. The non-transitory computer readable storage medium of claim 17, wherein the facilitating the determination comprises initiating a loopback measurement via the first set of network devices to facilitate an assessment of the first end-to-end network condition.

19. The non-transitory computer readable storage medium of claim 17, wherein the operations further comprise:
 in response to determining that the speed of the user equipment has increased, decreasing the time period.

20. The non-transitory computer readable storage medium of claim 17, wherein the survey success criterion is determined based on capability data indicative of a capability of the user equipment.

* * * * *